United States Patent [19]

Garcia

[11] Patent Number: 4,970,015

[45] Date of Patent: Nov. 13, 1990

[54] RADIATOR CLEANING COMPOSITION AND METHOD OF MANUFACTURE THEREOF

[75] Inventor: Silverio M. Garcia, Louisville, Colo.

[73] Assignee: Chem Shield, Inc., Denver, Colo.

[21] Appl. No.: 456,983

[22] Filed: Dec. 22, 1989

[51] Int. Cl.[5] ........................ C09K 13/06; C11D 7/08; C23G 1/02; B44C 1/22

[52] U.S. Cl. ................................ 252/079.4; 252/79.2; 252/142; 156/655; 134/22.1; 134/3; 134/40

[58] Field of Search ..................... 252/79.2, 79.4, 142, 252/146; 156/664, 655, 656; 134/2,3,22.1, 22.11, 22.14, 34, 40, 41

[56] References Cited

U.S. PATENT DOCUMENTS

| | | | |
|---|---|---|---|
| 4,181,622 | 1/1980 | Gavin | 134/3 X |
| 4,199,469 | 4/1980 | Walzer | 252/146 |
| 4,250,048 | 2/1981 | Leveskis | 252/142 |
| 4,477,364 | 10/1984 | Garcia | 252/142 |
| 4,569,779 | 2/1986 | Jabalee | 252/79.4 X |

*Primary Examiner*—William A. Powell

*Attorney, Agent, or Firm*—Donald W. Margolis; John L. Isaac

[57] ABSTRACT

An acidic solution for use as a radiator cleaning composition includes an aqueous solution of from about 1–8 weight percent an ethylene glycol base, and about 2–45 weight percent hydrochloric acid. In addition, approximately 2–45 weight percent of an aqueous hydrochloric acid-based composition is included, which composition has a pH of less than about 1.0 yet is substantially non-reactive with compounds having low oxidative states, including human skin tissue.

42 Claims, No Drawings

RADIATOR CLEANING COMPOSITION AND METHOD OF MANUFACTURE THEREOF

BACKGROUND OF THE INVENTION

1. Field of the Invention

The present invention relates to cleaning compositions and, more particularly, to strong acid-based cleaning compositions. Specifically, the present invention relates to a radiator cleaning composition having a pH value of less than 1.0, yet is nonreactive and nonirritating to human skin tissue.

2. Description of the Prior Art

Numerous compositions and processes have been employed in the past for the purpose of cleaning and removing corrosion products, rust, mineral deposits and scaling, grease, and oil residue from radiators that are used in cooling systems of automobiles, motorcycles, trucks, buses and other vehicles as well as in heavy equipment such as compressors, pumps, turbines and the like. Some of these cleaning processes include, but are not limited to, sand and bead blasting, wire brushing, power washing and muriatic acid cleaning. Other techniques include dipping the radiators in baths containing extremely caustic solutions with pH values greater than 12.5 and, in the great majority of cases, heated to as much as 190° F. Moreover, there are other processes that use ultrasonic cleaning devices in baths of caustic solutions heated from about 145° F. to 175° F.

Examples of acidic compositions which have been utilized for a wide variety of cleaning applications include U.S. Pat. Nos. 4,675,120, 3,514,407, 3,630,933, 4,116,713, 4,181,622, 4,199,469, and 4,250,048. While many of these referenced patents are not specifically designed for cleaning radiators and the like, they do disclose acid-based compositions for the purposes of cleaning a wide variety of different types of surfaces. One unfortunate and significant disadvantage of many of these acid-based cleaning compositions is that while they are effective cleaning agents, they can be extremely corrosive and highly reactive with human skin tissue as well as other compositions having relatively low oxidative states. U.S. Pat. No. 4,477,364 discloses an acidic glass cleaning composition which has a low pH value for cleaning yet is relatively innocuous to skin tissue. However, this particular disclosure is directed to the specific challenges relating to the cleaning of glass surfaces and is so limited thereto.

As mentioned above, prior art bath cleaning techniques include heating the bath to extremely dangerous temperatures. This procedure consumes great amounts of energy and becomes a hazard to use because it can cause both temperature burns and chemical burns. Workers involved in this type of work must wear protective clothing, eye protection, rubber gloves and boots at all times. These processes are also time consuming, do not do an effective cleaning job on heavy corrosion and scaling, and eventually destroy the buildings where they are housed due to the hot and caustic fumes generated by the process.

Once these radiators have been cleaned through any one of these prior art processes, a stage called "rodding" has to be performed. This process consists of a technician lancing each radiator tube with a metal rod to remove any remaining corrosion build-up or sediments from inside the radiator tubes. This procedure is a very time consuming job and involves working very closely with caustic residue left inside the radiator tubes.

As a result of the above, radiator shops have had to deal with expensive fuel consumption, exposure to dangerous, hot caustic solutions, and long working procedures when trying to clean radiators. Nonetheless, this has still not accomplished the desired degree of cleanliness, and bead blasting and wire brushing end up, in many cases, as the only alternative to a truly clean radiator. Consequently, there is still a need for an effective cleaning solution particularly applicable to radiators, such cleaners having requirements different from those of cleaning agents for other types of surfaces and applications. Such a cleaning composition need not be abrasive, and should be effective in removing corrosion products, rust, mineral deposits, scaling, grease and the like, while also being non-corrosive as well as non-reactive with human skin tissue to permit easy and safe use.

SUMMARY OF THE INVENTION

Accordingly, it is one object of the present invention to provide an effective radiator cleaning solution.

It is another object of the invention to provide an acid-based cleaning solution for radiators used in a variety of cooling systems, the solution having an extremely low pH capable of highly effective cleaning in the removal of corrosion products, rust, mineral deposits, scaling, grease and residue.

It is a further object of the present invention to provide an acid-based cleaning solution as described above which is also non-reactive to healthy human skin tissue and other compounds having low oxidative states to permit ease of handling.

To achieve the above and other objects and advantages of the present invention, an acidic solution for use as a radiator cleaning composition is disclosed. The solution includes an aqueous solution of from about 1–8 weight percent of an ethylene glycol base and about 2–45 weight percent hydrochloric acid. To this solution is added an additional 2–45 weight percent of an aqueous hydrochloric acid-based composition having a pH less than about 1.0, yet substantially non-reactive with compounds having low oxidative states including human skin tissue.

DETAILED DESCRIPTION OF THE PREFERRED EMBODIMENTS

By way of background, acids are hydrogen-containing substances which dissociate in water to produce one or more hydrogen ions. The concentration of hydrogen ions in a solution is known, of course, as the pH. In aqueous solutions, hydrogen ions ($H^+$) bond to one or more water molecules, and the ion formed when one hydrogen ion bonds to one water molecule is called the hydronium ion ($H_3O^+$). In dilute aqueous solutions, all strong acids donate a proton to water and are essentially 100% ionized to produce a solution containing hydronium ions plus the anions of the strong acid.

According to the principles established in the Bronstead-Lowry Theory, the acid dissociation reaction of each acid is different. This creates both strong acids and weak acids which in turn have conjugate bases that are correspondingly weak and strong, respectively. Also, by combining a weak acid with its conjugate acid salt, an acid solution is created which shows a moderate pH value at equilibrium.

When strong acids are mixed together, a great number of hydrogen ions are released and become available for further chemical reaction. If these strong acids are then further mixed with weak acids in the presence of water, the conjugate bases of the weaker acids that are formed in the reaction then serve as strong bases and function as regulators of the hydrogen ions produced by the strong acid combination.

When hydrochloric acid (HCl), a strong acid, is mixed with water, HCl virtually completely ionizes in dilute aqueous solution. The reaction between hydrochloric acid and water produces a high hydronium ion concentration, and the total hydronium ion concentration in this reaction comes from two sources: first, from the hydrochloric acid dissociation, and second, from the self-ionization of the water. The concentration of hydronium ions due to self-ionization of water is almost negligible but is quite substantial due to the hydrochloric acid dissociation. This is also the case with virtually all strong acids, and it is therefore customary to neglect the self-ionization concentration from all calculations. When this ionization of strong acid occurs, it is virtually impossible to distinguish among the strengths of the strong acids such as sulfuric acid, hydrochloric acid, HI, etc., when dealing with them in aqueous solutions. All of these aqueous solutions contain the same strong acid, namely the hydronium ion.

Water, under these circumstances, functions as a leveling agent on the strengths of all very strong acids, and their acidities are reduced to the level of the hydronium ion present in solution. The water increases the ionization disbursements and is the carrier for the entire electrolysis system. One of the advantages of this approach is its emphasis on the competitive nature of acid-base equilibrium in protonic solvents. Since the solvated hydrogen ion is the strongest acid that can exist in these solvents, the conjugate base of each acid competes for it. The strongest base reacts with the hydrogen ion to form the weaker undissociated acid.

It has been found that by changing the combinations of acids and their concentrations, the behavior of the strong acid can be controlled, and the amount of available hydrogen ions can be increased or decreased to accelerate or slow down the reaction. When this is done, acid solutions with extremely low pH values and high amounts of free hydrogen ions can be formulated. These solutions are found to be non-corrosive to metal, innocuous to skin and capable of providing enormous amounts of hydrogen ions that, when combined with other acids, provide an excellent environment for effective performance in cleaning, disinfecting and preparation of all kinds of surfaces.

For example, when we add hydrochloric acid to these solutions, the resulting formula exhibits the pH of the totally ionized HCl. The hydrogen ion becomes bound, and the solution subsequently releases it in proportion to the oxidation state of the substance with which it comes in contact.

As explained above, the weaker acids in the aqueous acidic solution function as strong bases that hold the hydrogen ion in shifting electron sharing. The presence of compounds of a higher oxidative state de-stabilize the hold and free the hydrogen ions. If, in turn, the solution comes in contact with compounds that have extremely low oxidative states, such as unbroken human skin or even sclera of guinea pigs or rabbits, there is little or no reactivity at all.

The present invention provides an improved acidic solution for use as a radiator cleaner for removal of corrosion products, rust, mineral deposits and scaling, grease and oil residue from radiators that are used in cooling systems of automobiles, motorcycles, trucks, buses and other vehicles as well as in heavy equipment such as compressors, turbines, pumps and the like. The preferred solution comprises from about 2–75 weight percent of an aqueous (preferably distilled water) solution containing 1–8 weight percent of an ethylene glycol base, from about 2–45 weight percent of hydrochloric acid, and from about 2–45 weight percent of an aqueous hydrochloric acid-based composition having a pH value of less than about 1.0, which is substantially non-reactive with compounds having low oxidative states including human skin tissue.

The aqueous acid-based composition of the end product, which is formed from selected inorganic and organic acids, possesses unique properties. Specifically, the aqueous acid-based composition has strong acid properties, i.e. a pH value of less of about 0.91, and yet is substantially inert to healthy human skin so that contact of the aqueous acid-based composition with a user's skin does not result in burns or even irritation to the skin of the user.

The end solution of the preferred embodiment is a product of mixing a very strong acid with a plurality of weaker acids in the presence of water in such a manner that the conjugate bases of the weaker acids function as strong bases to control the production of hydronium ions in the strong acid. The main source of hydronium ions in the solution is the hydrochloric acid as it dissociates in water. This dissociation is virtually uncontrolled and requires the other weaker acids to create the conjugate strong bases to bring this production of hydronium ions under control. The composition of the end product can vary widely and will be dependent on a delicate balance of the hydrochloric acid and the aqueous acid-based composition. In cases where distilled water can't be found, regular tap water can be substituted as long as its hardness is either controlled or an increase in the volume of hydrochloric acid would become necessary. Also, with hard water, a balance in the amount of the ethylene glycol base must be achieved.

The second essential ingredient of the solution of the present invention is the aqueous acid-based composition having a pH value of less than about 1.0. The unique aqueous acid-based composition is prepared by a process wherein the ingredients are believed to be critical. Moreover, the specific order of addition of the ingredients used in the formulation of the aqueous acid-based composition is also critical, and especially desirable results have been obtained when the aqueous acid-based composition is prepared in accordance with the procedure described below.

More particularly, the hydrochloric acid-based composition includes an aqueous hydrochloric acid solution admixed with an effective amount of at least one weak acid to produce strong conjugate bases to control the dissociation production of hydronium ions by the hydrochloric acid in solution. A more preferred embodiment includes a solution of hydrochloric acid and phosphoric acid admixed with an effective amount of at least one weak organic acid to produce strong conjugate bases.

The preferred embodiment is an acidic solution wherein the 2–45 weight percent aqueous hydrochloric acid-based composition includes an aqueous mixture of about 5–20 weight percent hydrochloric acid with about 5–20 weight percent phosphoric acid admixed with approximately 1–5 weight percent of any suitable hydroxy carboxylic acid and approximately 1-5 weight percent of a suitable dicarboxylic acid. In preferred form, the hydroxy carboxylic acid may be selected from any one of the group including citric acid, tartaric acid and malic acid, although the preferred embodiment includes citric acid. Moreover, the dicarboxylic acid of the solution may be selected from any one of the group consisting of oxalic acid, malonic acid, succinic acid, glutaric acid, and adipic acid, although the preferred dicarboxylic acid is oxalic acid. The hydrochloric acid-based composition may further include 1-3 weight percent of a poly methyl amine which is preferably selected from hexamethylenetetramine, hexamethylenediamine and hexamethyleneamine, although hexamethylenetetramine is the preferred embodiment.

The most preferred composition as a radiator cleaning material includes approximately 48% by weight distilled water, 2% by weight of butyl ethylene glycol base, and 25% by weight of the hydrochloric acid-based composition as described above that has a pH of less than about 1.0.

The initial step in the preparation of the preferred aqueous acid-based composition of the solution of the present invention comprises admixing from about 5 to about 20 weight percent hydrochloric acid with about 5 to about 20 weight percent phosphoric acid in a vessel for an effective period of time to provide a substantially homogeneous acidic mixture. Because strong fumes are emitted upon mixing the hydrochloric acid and the phosphoric acid, care should be exercised in the mixing of the two components to insure that the mixing step is carried out in a well ventilated area or hood. The time required to mix the hydrochloric acid and phosphoric acid so as to provide a substantially homogeneous acidic mixture can vary widely and will generally depend upon the rate of addition of the two components, amounts of the two components, the rate or speed of agitation and the like. However, approximately 10-20 minutes mixing time will generally produce a homogeneous mixture.

The homogeneous acidic mixture formed from the hydrochloric acid and phosphoric acid is then admixed with an effective amount of water, preferably distilled water, to provide an aqueous acidic mixture. The amount of water employed in the formulation of the aqueous acidic mixture can vary widely, but is generally an amount sufficient to provide from about 47 to about 87 weight percent water in the aqueous acidic mixture. The aqueous acidic mixture is thoroughly stirred to insure substantially complete dispersion of the homogeneous acidic mixture of the hydrochloric acid and the phosphoric acid into the water and to provide a substantially uniform aqueous acidic mixture.

This aqueous acidic mixture is then agitated, and from about 1 to about 5 weight percent of a hydroxy carboxylic acid and from 1 to about 5 weight percent of a dicarboxylic acid are then preferably admixed therewith. These weak acids are added to further control the dissociation reaction and production of hydronium ions. As indicated above, the hydroxy carboxylic acid and the dicarboxylic acid are both critical ingredients in the formulation of this preferred aqueous acid-based composition. The amount of hydroxy carboxylic acid and dicarboxylic acid incorporated into the aqueous acidic mixture of the hydrochloric acid and phosphoric acid can vary widely within the ranges set forth hereinabove. However, the optimum amounts of hydroxy carboxylic acid and dicarboxylic acid admixed with the aqueous acidic mixture are the amounts required to provide from about 1 to about 5 weight percent of the hydroxy carboxylic acid and from about 1 to about 5 weight percent of the dicarboxylic acid in the aqueous acid-based composition.

Any suitable hydroxy carboxylic acid may be employed in the preparation of the aqueous acid-based composition of the solution of the present invention. Typical of such hydroxy carboxylic acids are citric acid, tartaric acid, malic acid, and the like. However, especially desirable results have been obtained wherein the hydroxy carboxylic acid added to the aqueous acidic mixture is citric acid.

Any suitable dicarboxylic acid may be employed in the preparation of the aqueous acid-based composition of the solutions of the present invention for controlling hydronium ion production. Typical of such dicarboxylic acids are oxalic acid, malonic acid, succinic acid, glutaric acid, adipic acid, and the like. Desirable results have been obtained when the dicarboxylic acid added to the aqueous acidic mixture is oxalic acid.

The aqueous acid-based composition so produced will preferably contain from about 40 to about 90 weight percent water, and more preferably from about 47 to 87 percent water. Thus, depending upon the amount of hydroxy carboxylic acid and dicarboxylic acid added to the aqueous acidic mixture, as well as the amount of water initially added to the acidic mixture formed by the hydrochloric acid and the phosphoric acid, it may be desirable to further dilute the aqueous acid-based composition with an effective amount of water to insure that the concentration of water in the aqueous acid-based composition is from about 40 to about 90 weight percent, and preferably from about 47 to about 87 weight percent. In those instances where it is determined that the amount of water present in the aqueous acid-based composition is less than the specified amount, the aqueous acid-based composition is admixed with an effective amount of water so as to provide the aqueous acid-based composition of the solution with the desired amount of water.

When the weak acids added to further control the dissociation reaction are oxalic and citric acids, in the presence of water, the oxalic acid also provides a secondary source of hydronium ions and is of extreme importance in regulating the pH of the end product. The more oxalic acid added to the formulation, the lower the pH and the more active the solution becomes with respect to the removal of oxides and carbonates from bathroom radiator installation surfaces. The citric acid provides the final controller of excess hydronium ions that might have been created by the addition of oxalic acid. If more oxalic acid is added to the solution, more citric acid must be added. Otherwise, the solution may lose its ability to remain innocuous and inert to skin and other organic materials of low oxidative states.

The aqueous acid-based composition used in the solution of the present invention is a substantially colorless liquid having an appearance substantially similar to water. Further, the aqueous acid-based composition prepared as set forth hereinbefore, has a pH value of less than 1.0, i.e. about 0.91 and as low as 0.2, and is substantially inert to healthy human skin and other organic materials having low oxidative states.

Once the above mixture is accomplished, an effective minor amount of a poly methyl amine may be selectively admixed with the aqueous acid-based composition to provide an amine-containing aqueous acid-based composition. When this is done, the concentration of acids in the solution can be increased without generating excess gases.

The effective minor amount of the poly methyl amine incorporated into the aqueous acid-based composition used in the formulation of the amine-containing solution can vary widely, but will generally range from about 1 to about 3 weight percent. Further, any suitable poly methyl amine compatible with the aqueous acid-based composition may be employed. Typical of such poly methyl amines are hexamethylenetetramine, hexamethylenediamine, hexamethyleneamine and the like. However, desirable results have been obtained where the poly methyl amine is hexamethylenetetramine, and the hexamethylenetetramine is incorporated into the aqueous acid-based composition in an amount to provide from about 1 to about 3 weight percent of the poly methyl amine in the amine-containing solution employed.

Through experimentation, it has been found that the final end product, when in combination with other acids including up to 50% by volume in certain cases, provides the user of these acidic solutions with a plurality of products that can be used in radiator cleaning and rejuvenation while retaining the safe handling properties of the original product, including that of being innocuous to skin and other organic materials. All mixing and storage containers employed in the production of the acidic compositions of the present invention are preferably fabricated of a substance that is acid resistant, such as stainless steel, plastic, Fiberglass, glass, and the like. It is also preferred that all containers used in the process of the present invention be provided with covers for safety reasons and to keep foreign materials out of the product, especially the container in which the hydrochloric acid and the phosphoric acid are mixed.

The aqueous acid-based composition produced as set forth above is an essential ingredient in the formulation of the radiator cleaner compositions of the present invention. In the preparation of the acidic radiator cleaner, about 2–45 weight percent of hydrochloric acid (HCl, d=1.19 g/cc) is admixed with the aqueous acid-based composition in a well-ventilated area until a substantially uniform mixture is obtained. It is to be noted that the aqueous acid-based composition is preferably maintained under constant agitation during the mixing of the radiator cleaner solution so that the resulting acidic composition is a substantially homogeneous solution.

The time required to thoroughly mix the hydrochloric acid with the aqueous acid-based composition to form the radiator cleaner composition can vary widely, and the mixing time and period will generally depend on the rate of addition of the hydrochloric acid to the aqueous acid-based composition, the amount of hydrochloric acid employed in the formulation, and the rate of speed of agitation of the aqueous acid-based composition during the addition of the hydrochloric acid.

Once the hydrochloric acid has been added, an equal amount of distilled water must be admixed to the above resulting acidic composition containing the hydrochloric acid. Again, care should be exercised when adding the acidic composition to the water, and the rate and time of mixing may vary greatly. The mixing should be maintained continuously and done thoroughly so that a homogeneous solution can be maintained. Once the above is accomplished, the preferred 1–8 weight percent butyl ethylene glycol base is added to the above mixture while keeping the solution under constant mixing to provide a homogeneous solution.

In order to more fully describe the present invention, the following examples are set forth. However, it is to be understood that these examples are for illustrative purposes only and are not to be construed as limiting the scope of the present invention as defined in the appended claims.

EXAMPLE I

Preparation of Aqueous Acid-based Composition 72 pounds of hydrochloric acid and 42 pounds of phosphoric acid were added to an acid-resistant container, and the acids were stirred to produce a substantially homogeneous acidic mixture. During the mixing of the hydrochloric acid and the phosphoric acid, fumes were generated. Thus, the mixing was carried out in a well ventilated area.

330 pounds of water were then placed into a second container, and 114 pounds of the hydrochloric-phosphoric acid mixture were added to the water in the second container. The resulting aqueous acidic solution was thoroughly mixed. Thereafter, 22 pounds of powdered citric acid and 15 pounds of powdered oxalic acid were admixed into the aqueous acidic mixture to produce an aqueous acidic composition.

The aqueous acidic composition was then diluted by admixing 481 pounds of the aqueous acidic composition with 330 pounds of water in a third container. The aqueous acidic composition and water were thoroughly stirred and provided approximately 97 gallons of an aqueous acid-based composition having a pH value of about 0.49, which composition was non-reactive with healthy human tissue despite the extremely low pH.

The mixing and storage containers employed were formed of materials substantially acid resistant. Further, all containers were covered for safety reasons and to prevent foreign materials from being injected into the aqueous acid-based composition.

EXAMPLE II

Preparation of an Amine-Containing Aqueous Acid-Based Composition

In the preparation of an amine-containing aqueous acid-based composition, the same steps and procedures set forth in Example I for the preparation of the basic aqueous acid-based composition were carried out. Following the dilution of the aqueous acid-based composition described above, 17 pounds of hexamethylenetetramine were admixed into about 811 pounds of the aqueous acid-based composition, and mixing continued until a substantially homogeneous colorless liquid was formed. Approximately 100 gallons of the amine-containing aqueous acid-based composition was formed using this procedure, and the amine-containing aqueous acid-based composition had a pH value of about 0.91 and was innocuous when put into contact with human skin tissue.

As in the preparation of the aqueous acid-based composition of Example I, all mixing and storage containers employed were acid resistant containers. Further, each of the containers was covered for safety reasons and to prevent foreign materials from being introduced into the product.

EXAMPLE III

Preparation of a Radiator Cleaning Solution

After the 100 gallon amine-containing aqueous acid-based composition in Example II above was mixed, 100 gallons of hydrochloric acid (d=1.19 g/cc) was admixed therewith until a substantially homogeneous, colorless liquid was formed. The resulting 200 gallons of the aqueous acidic solution now showed a pH value of 0.41.

Again, the mixing and storage containers employed were formed of materials that are basically acid resistant, and all containers were covered for safety reasons and to prevent foreign materials from entering into the resulting aqueous acidic component.

5 gallons of butyl propylene glycol base (butyl E.B.) were then added to the 200 gallons of the above aqueous acidic solution. This admixing was continued until a homogeneous solution was obtained. At this stage, there were about 205 gallons of an aqueous acidic composition of a pH value of about 0.49. This aqueous acidic composition was then diluted with about 200 gallons of distilled water to form roughly 400 gallons of the final aqueous acidic radiator cleaning composition that was used in all of the tests that were run on the radiators described in the Examples that follow.

EXAMPLE IV

Test with Heavy Duty Radiators

Two similar heavy duty Flyer brand radiators, with five rows of tubes each, were utilized in this test. These radiators had been in service for approximately 12 months, installed in buses servicing the San Mateo, California County Transportation District, and were tested simultaneously as indicated below.

Radiator One was dipped in a bath of caustic solution with a pH of 13.5 and heated to 180° F. as in traditional cleaning. Radiator Two was dipped in a bath of chemical solution of Example III above. The pH of this solution was 2.0 and its temperature was 68° F.

After a period of two (2) hours, both radiators were removed from their respective baths and checked for cleanliness. It was found that Radiator One (dipped in the caustic solution) still needed considerable cleaning and had to be re-dipped in the solution for an additional two (2) hours. Radiator Two, in the meantime, was observed clean and ready for repairing after the initial two (2) hours.

Once the radiators showed similar cleanliness (Radiator One after four (4) hours, Radiator Two after two (2) hours), they were then flushed with clean water and tested at 20 psi for leaks. Both radiators showed minor leaks and were repaired accordingly. Once the repairs were completed, the radiators were again tested at 20 psi.

At this time, Radiator One showed the need for "rodding", that is the tubes were still obstructed and needed to be lanced. Radiator Two, however, showed clean tubes and no need for rodding.

Radiator Two was then dried and painted while Radiator One was being rodded. After this traditional rodding process, Radiator One was again tested, and additional leaks were found. These leaks were repaired, and the radiator was then tested a fourth time, whereas Radiator Two had been tested only twice.

After this final test, Radiator One was dried and painted. The period of time elapsed until both radiators were ready for installation and reuse, was three and a half ($3\frac{1}{2}$) hours for Radiator Two, and six and a half ($6\frac{1}{2}$) hours for Radiator One. Moreover, the additional labor and materials required for Radiator One added substantially to the expense of cleaning it as compared to the expense of cleaning Radiator Two using the present invention.

EXAMPLE V

Test with Standard Automobile Radiators

In this Example V, two similar radiators from two 1984 Ford LTD's, 302 engines (model 362—cross flow radiators with eleven (11) fins per inch and including transmission oil coolers) were tested as in Example IV above.

Again, Radiator One was dipped in the caustic solution while Radiator Two was dipped in the improved acid composition of the invention as described in Example III above.

Radiator One took one (1) hour to clean in the caustic solution, while Radiator Two took only fifteen (15) minutes in the acidic composition of the present invention. Both radiators were then tested and repaired accordingly, and both were then rodded as a precaution and re-tested again. In this instance, neither one needed additional repairs. The time elapsed until the radiators were ready for installation was one and a half ($1\frac{1}{2}$) hours for Radiator One and forty five (45) minutes for Radiator Two.

EXAMPLE VI

Test with a Plastic and Copper Radiator

The radiator of an 1987 Honda Prelude automobile (110 c.c. engine) with automatic transmission and air conditioner was tested in the solution of Example III above. This radiator was a down flow type radiator, with plastic top and a Modine brand model 933 copper core.

As an historic background, if this radiator would have arrived before the improved acidic solution of the invention was in use, the cleaning process would have had to be done by hand with a pressure washer, because this type of radiator cannot be dipped in a caustic solution nor can it be cleaned via an ultrasonic device because the chemical reactions that occur are violent and cause severe damage to the core.

Since the improved acidic solution started to be tested, these type of radiators were effectively cleaned in fifteen (15) minutes or less.

EXAMPLE VII

Test with a Plastic and Aluminum Radiator

Prior to the present invention, aluminum radiators could only be cleaned utilizing expensive and time consuming ultrasonic techniques. However, when such aluminum radiators were treated with the solution of the invention as provided in Example III above, they were cleaned in eight (8) minutes or less, without damage to the aluminum parts of the radiator.

EXAMPLE VIII

Test with a Heavily Corroded Radiator

The radiator of a seven (7) month old Toyota brand fork lift was treated in this Example. It showed extremely heavy build-up of corrosion, carbonates and silicates, inside of the radiator. This radiator was immersed in its entirety in the boil-out tank for a period of eight (8) hours in a caustic solution showing a pH of 12.5 and 165° F. using traditional techniques.

After the eight (8) hours, the technician tried to flush the radiator to remove all the loose material from inside but was unsuccessful in three (3) attempts to do so. The rodding process was also unsuccessful because over 75% of the tubes could not be lanced due to blockages of the corrosion materials.

Because a new radiator for this fork lift costs over $400.00, the owner agreed to let the radiator be tested utilizing the improved acidic composition shown in Example III above. The results of this test were outstanding. After only fifteen (15) minutes in the tank the radiator was taken out and flushed completely. It was also rodded in its entirety without any problems and was put back in service within one and a half hours (1½) from the time it had been dipped in the improved acidic composition of the present invention.

It should be noted that prior to the development of the improved acidic composition of the present invention, no radiator cleaning job could be completed by closing time at 5:00 p.m. if the radiator came into a shop after 2:30 p.m. Using the present invention, jobs can be started as late as 3:30 p.m. and be completed with as much as one (1) hour to spare. This new procedure and composition allows for a much more effective use of time and increases production levels by as much as 75%.

Another aspect of the present invention is that of safety. On several occasions in the past, the gas pilot in the burner of a caustic boil-out tank would blow out during the night, and in the morning gas fumes and odor would be very noticeable in the shop. In the past, the hot fumes from the boil-out tank would damage the metal structure of the building and roof, would cause burns in the skin of the technicians and destroy uniforms and tools. Using the present invention, the boil-out tank is eliminated, great energy savings are realized, and all other problems related to this situation have been greatly reduced or completely eliminated.

Finally, "fine seepers" or very small leaks in radiators that could not previously be detected are now discovered the first time around and can be properly corrected immediately. This capability practically eliminates radiators from coming back time after time due to this very annoying problem.

As can be seen from the above, the present invention provides a highly effective radiator cleaner composition which has as a basis for cleaning an acidic solution with a very low pH. The advantage of the present invention, as clearly seen from the above, is that while the pH of the solution is very low to provide highly effective cleaning, the pH is not so toxic as to cause damage to the radiator or surrounding areas. Moreover, due to the unique nature of the present invention, the low pH acid-based composition of the invention is innocuous to human skin tissue as well as being non-reactive with other organic compositions of low oxidative states. This is substantially different from strong caustic cleaning solutions presently on the market which require very special handling and which can create toxic fumes either during use or during the mixture thereof. Finally, the present invention is readily biodegradable so that it may be flushed down the drain without any environmental concerns or toxicity problems.

While this invention has been particularly shown, described and illustrated with reference to preferred embodiments and modifications and examples thereof, it should be understood by those skilled in the art that the foregoing and other modifications are exemplary only, and that equivalent changes in form and detail may be made therein without departing from the true spirit and scope of the invention as claimed, except as precluded by the prior art.

The embodiments in which an exclusive property or privilege is claimed are defined as follows:

1. An acidic solution for use as a radiator cleaning composition comprising an aqueous solution of from about 1–8 weight percent of an ethylene glycol base, about 2–45 weight percent hydrochloric acid, and about 2–45 weight percent of an aqueous hydrochloric acid based composition having a pH of less than about 1.0, yet substantially non-reactive with compounds having low oxidative states including human skin tissue.

2. The acidic solution of claim 1, wherein said hydrochloric acid-based composition comprises a dilute, aqueous hydrochloric acid-based solution admixed with an effective amount of at least one weak acid to produce strong conjugate bases to control the disassociation production of hydronium ions.

3. The acidic solution as claimed in claim 2, wherein said hydrochloric acid-based composition comprises a dilute aqueous solution of hydrochloric acid and phosphoric acid admixed with an effective amount of at least one weak organic acid to produce strong conjugate bases to further control hydrochloric acid disassociation production of hydronium ions.

4. The acidic solution as claimed in claim 3, wherein said hydrochloric acid-based composition comprises an aqueous mixture of about 5–20 weight percent hydrochloric and about 5–20 weight percent phosphoric acid admixed with approximately 1–5 weight percent of an hydroxy carboxylic acid and approximately 1–5 weight percent of a dicarboxylic acid.

5. The acidic solution as claimed in claim 4, wherein said hydrochloric acid based composition further comprises about 1–3 weight percent of a poly methyl amine.

6. The acidic solution as claimed in claim 4, wherein said hydroxy carboxylic acid is selected from the group consisting of citric acid, tartaric acid, and malic acid.

7. The acidic solution as claimed in claim 6, wherein said hydroxy carboxylic acid is comprised of citric acid.

8. The acidic solution as claimed in claim 4, wherein said dicarboxylic acid is selected from the group consisting of oxalic acid, malonic acid, succinic acid, glutaric acid and adipic acid.

9. The acidic solution as claimed in claim 8, wherein said dicarboxylic acid comprises oxalic acid.

10. The acidic solution as claimed in claim 5, wherein said poly methyl amine is selected from the group consisting of hexamethylenetetramine, hexamethylenediamine and hexamethyleneamine.

11. The acidic solution as claimed in claim 10, wherein said poly methyl amine comprises hexamethylenetetramine.

12. The acidic solution as claimed in claim 4, wherein said solution further comprises approximately 2–3 weight percent of an acid thickening agent.

13. The acidic solution as claimed in claim 1, wherein said ethylene glycol base comprises butyl ethylene glycol.

14. The acidic solution as claimed in claim 13, wherein said aqueous solution includes approximately 2–75 weight percent distilled water.

15. The acidic solution as claimed in claim 1, wherein said solution comprises an aqueous solution of approximately 50 weight percent of said aqueous hydrochloric acid-based composition, and approximately 50 weight percent glycol and hydrochloric acid solution.

16. The acidic solution as claimed in claim 15, wherein said hydrochloric acid-based composition comprises an aqueous mixture of about 5–20 weight percent hydrochloric acid and about 5–20 weight percent phosphoric acid admixed with approximately 1–5 weight percent of an hydroxy carboxylic acid and approximately 1–5 weight percent of a dicarboxylic acid.

17. The acidic solution as claimed in claim 16, wherein said hydroxy carboxylic acid is selected from the group consisting of citric acid, tartaric acid, and malic acid, and wherein said dicarboxylic acid is selected from the group consisting of oxalic acid, malonic acid, succinic acid, glutaric acid and adipic acid.

18. The acidic solution as claimed in claim 17, wherein said hydroxy carboxylic acid comprises citric acid, and wherein said dicarboxylic acid comprises oxalic acid.

19. The acidic solution as claimed in claim 18, wherein said hydrochloric acid-based composition further comprises about 1–3 weight percent of a poly methyl amine.

20. The acidic solution as claimed in claim 19, wherein said solution further comprises approximately 2–3 weight percent of an acid thickening agent.

21. A process for preparing an acidic solution for use as a radiator cleaning composition having a pH of less than about 1.0 while being non-reactive with human skin tissue, comprising admixing approximately 2–75 weight percent water and approximately 1–8 weight percent of an ethylene glycol base with approximately 2–45 weight percent of a hydrochloric acid, and further admixing this glycol-acid solution with about 2–45 weight percent of an aqueous acid-based composition, said aqueous acid-based composition being prepared by the steps of:

admixing from about 5–20 weight percent hydrochloric acid with about 5–20 weight percent phosphoric acid to produce an acidic mixture; and admixing said acidic mixture with an effective amount of water to produce an aqueous acid-based composition having approximately 47–87 weight percent water.

22. The process as claimed in claim 21, wherein said aqueous acid-based composition is admixed with an effective amount of at least one weak organic acid to produce strong conjugate bases to control hydrochloric acid dissociation production of hydronium ions therein.

23. The process of claim 22, wherein said aqueous acid-based composition is further admixed with approximately 1–5 weight percent of a hydroxy carboxylic acid and with from about 1–5 weight percent of a dicarboxylic acid.

24. The process as claimed in claim 23, wherein said hydroxy carboxylic acid is selected from the group consisting of citric acid, tartaric acid, and malic acid.

25. The process as claimed in claim 23, wherein said dicarboxylic acid is selected from the group consisting of oxalic acid, malonic acid, succinic acid, glutaric acid and adipic acid.

26. The process as claimed in claim 23, wherein said hydroxy carboxylic acid comprises citric acid and said dicarboxylic acid comprises oxalic acid.

27. The process as claimed in claim 23, wherein said acid-based composition is further admixed with a poly methyl amine.

28. The process as claimed in claim 21, wherein said 5–20 weight percent phosphoric acid functions as a controller for hydronium ion production by the disassociation of hydrochloric acid in water, and wherein said hydronium ion production is further controlled by adding an effective amount of yet another weak acid.

29. The process as claimed in claim 28, wherein said weak acid comprises hydroxy carboxylic acid, and further comprises the step of adding yet a third weak acid to control hydronium ion production created by the disassociation of hydrochloric acid in water as well as created by the addition of said hydroxy carboxylic acid.

30. The process as claimed in claim 29, wherein said additional weak acid comprises a dicarboxylic acid.

31. The process as claimed in claim 21, wherein said glycol base comprises butyl ethylene glycol.

32. An acidic radiator cleaning composition comprising approximately 2–75 weight percent distilled water, about 1–8 weight percent of an ethylene glycol base, approximately 2–45 weight percent hydrochloric acid, and approximately 2–45 weight percent of an aqueous hydrochloric acid-based composition having a pH of approximately less than 1.0 and prepared by the steps of:

admixing from about 5–20 weight percent hydrochloric acid with about 5–20 weight percent phosphoric acid to produce an acidic mixture; and admixing said acidic mixture with an effective amount of water to produce an aqueous acid-based composition having approximately 47–87 weight percent water.

33. A radiator cleaning composition as claimed in claim 32, wherein said aqueous acid-based composition is admixed with an effective amount of at least one weak organic acid to produce strong conjugate bases to control hydrochloric acid dissociation production of hydronium ions therein.

34. The radiator cleaning composition of claim 33, wherein said aqueous acid-based composition is further admixed with approximately 1–5 weight percent of a hydroxy carboxylic acid and with from about 1–5 weight percent of a dicarboxylic acid.

35. The radiator cleaning composition as claimed in claim 34, wherein said hydroxy carboxylic acid is selected from the group consisting of citric acid, tartaric acid, and malic acid.

36. The radiator cleaning composition as claimed in claim 34, wherein said dicarboxylic acid is selected from the group consisting of oxalic acid, malonic acid, succinic acid, glutaric acid and adipic acid.

37. The radiator cleaning composition as claimed in claim 34, wherein said hydroxy carboxylic acid comprises citric acid and said dicarboxylic acid comprises oxalic acid.

38. The radiator cleaning composition as claimed in claim 34, wherein said acid-based composition is further admixed with a poly methyl amine.

39. The radiator cleaning composition as claimed in claim 32, wherein said 5–20 weight percent phosphoric acid functions as a controller for hydronium ion production by the disassociation of hydrochloric acid in water, and wherein said hydronium ion production is further controlled by adding an effective amount of yet another weak acid.

40. The radiator cleaning composition as claimed in claim 39, wherein said weak acid comprises hydroxy carboxylic acid, and further comprises the step of adding yet a third weak acid to control hydronium ion production created by the disassociation of hydrochloric acid in water as well as created by the addition of said hydroxy carboxylic acid.

41. The radiator cleaning composition as claimed in claim 40, wherein said additional weak acid comprises a dicarboxylic acid.

42. The radiator cleaning composition as claimed in claim 32, wherein said glycol base comprises butyl ethylene glycol.

* * * * *